United States Patent [19]
Oxley et al.

[11] Patent Number: 5,207,609
[45] Date of Patent: May 4, 1993

[54] BUFFERED ACID-TREATED FOOD CASING

[75] Inventors: Jeffery A. Oxley, Naperville; Jerome J. M. Rasmussen, Burbank, both of Ill.; James E. Draper, Midvale, Utah; Thomas J. Mann, Bolingbrook; Brian R. Samuels, Frankfurt, both of Ill.

[73] Assignee: Viskase Corporation, Chicago, Ill.

[21] Appl. No.: 851,383

[22] Filed: Mar. 12, 1992

Related U.S. Application Data

[62] Division of Ser. No. 420,854, Oct. 13, 1989, Pat. No. 5,108,804.

[51] Int. Cl.$^5$ .............................................. A22C 13/00
[52] U.S. Cl. ........................................ 452/27; 426/135; 428/34.8; 138/118.1
[58] Field of Search .................. 452/27, 21, 22, 50; 426/105, 135, 650; 428/34.8; 138/118.1

[56] References Cited

U.S. PATENT DOCUMENTS

| | | | |
|---|---|---|---|
| 3,930,035 | 12/1975 | Burke et al. | 426/105 |
| 4,377,187 | 3/1983 | Chiu | 426/105 |
| 4,431,033 | 2/1984 | Nicholson | 426/105 |
| 4,504,501 | 3/1985 | Nicholson | 426/105 |
| 4,505,939 | 3/1985 | Chiu | 426/105 |
| 4,592,918 | 6/1986 | Chiu | 426/650 |
| 5,108,804 | 4/1992 | Oxley et al. | 426/135 |

*Primary Examiner*—Willis Little
*Attorney, Agent, or Firm*—John C. LeFever

[57] ABSTRACT

Cellulosic food casing uniformly impregnated with an acid and a buffering agent renders the casing peelable from the denatured frozen outer skin of an encased raw pork-containing product.

16 Claims, 8 Drawing Sheets

FUNCTIONAL OPERATING AREA
Na MALATE

BUFFERED ACID-TREATED FOOD CASING

This application is a division of prior U.S. application Ser. No. 07/420,854, filing date Oct. 13, 1989 now U.S. Pat. No. 5,108,804.

BACKGROUND OF THE INVENTION

1. Field of the Invention

This invention relates to cellulosic food casings, and more particularly, to shirrable food casings which are treated with an acid and a buffering agent to render the casings peelable from an encased food product, to impart improved skin formation on the food product, and to impart improved coloration to the food product.

2. Description of the Prior Art

Surface appearance is an important factor in the commercial and consumer acceptance of meat products. Consumers of meat emulsion products associate a bright pink or red color as being a normally acceptable surface characteristic for products such as frankfurters, bolognas, salamis, vienna sausages, and the like. This color is usually developed during cooking, curing, or processing of the meat emulsions, the emulsion comprising comminuted or chopped meat, meat products, spices and curing agents. Meat emulsions, when subjected to smoke house processing, are normally adequately cooked with regard to edibility and texture within standard conditions of time humidity and temperature for such emulsions. However, the thusly cooked and cured product generally does not develop an acceptable red cured meat color in its core during this processing period. Usually, the product must be subjected to further processing before the desired red cured meat color is obtained. This longer processing time increases the cost of manufacture and also results in a significant loss of weight of the product.

A process of treating synthetic sausage casing so that red color will develop on the surface of a meat emulsion stuffed therein is disclosed in U.S. Pat. No. 3,361,577 to Simon et al, wherein food casings are treated with an edible reducing agent. The reducing agents which can be employed therein are compounds selected from l-ascorbic acid, isoascorbic acid, and metal salts and esters of these acids. In the practice of said process, an edible stabilizer is employed to assist in retarding oxidation of the reducing agent. Suitable oxidation inhibitors therein include the saturated aliphatic hydroxy acids such as citric acid, tartaric acid and the edible salts. However, it has been found that such treated synthetic food casings degrade during prolonged storage, thus limiting their utility.

Reddened color development is also important and desirable in raw unprocessed pork-containing meat products as for example, fresh pork or pork-beef sausage. The consumer prefers to see this color in the as-purchased product as an indication of freshness rather than rely solely on cooking for color development.

A cellulosic food casing having "easy peel" characteristics from insitu processed frankfurters after acid showering is disclosed by Rose et al in U.S. Pat. No. 3,674,511 wherein the food casing is treated with a soluble, edible salt, chelate or coordination compound of iron, aluminum, calcium or magnesium. Typical compounds include sulfates, citrates, malates, tartrates, gluconates, ascorbates, erythorbates, chlorides, and nitrates of iron, calcium or magnesium, either in the form of water soluble salts buffered to a pH at which the metal ion remains in solution, or in the form of mixed or double salts. It is disclosed therein that when solutions of these compounds are applied to frankfurter type casings during manufacture of the casings, the solutions must be buffered to a pH greater than 4 and typically above about 5.7 to prevent acidic degradation of the casings.

Food casings used in the processed food industry are generally thin-walled tubing of various diameters prepared from regenerated cellulose, cellulose derivatives, alginates, collagen and the like. Fibrous webs may also be embedded in these food casings and such casings are commonly termed in the art as "fibrous food casings". In general, these casings have multifunctional uses in that they may be employed as containers during the processing of the food product encased therein and also serve as a protective wrapping for the finished product. In the sausage meat industry, however, the preparation of various types of sausages ranging in size from smaller sausages such as frankfurters up to the larger sizes such as bolognas usually involves removing the casing from about the processed meat prior to final packaging. Peeling the casing from the processed sausage has presented major problems, particularly in the production of frankfurters where large numbers of the product are involved and the desire in commercial operations is to use high-speed, automatic stuffing and peeling machines.

The aforedescribed casings have also been used in the preparation of raw unprocessed pork-containing products as for example, fresh pork sausage or even fresh pork-beef sausage which typically contains substantial proportions of pork as for example, 45 wt %. High speed packing machines are also used in the manufacture of these products.

When the casing is removed from the meat mass, there is occasionally a tendency for some meat to adhere to the casing and be torn from the sausage with the casing, thereby causing surface marring of the sausage. In other instances, variations in the meat emulsion formulations or in the processing conditions can result in a degree of adherence of the casing to the product which hinders rapid removal of the casing from the product encased therein. The use of high-speed, automatic peeling machines in commercial operations, for example, such as those disclosed in U.S. Pat. Nos. 2,424,346 to Wilcoxon, 2,514,660 to McClure et al, 2,686,927 to Greg, and 2,757,409 to Parkers et al, makes it particularly essential that there be minimal resistance to the separation of casing from sausage, or the product will jam at the peeler or go through unpeeled. Less than complete removal of the casing necessitates the expense of hand sorting and peeling.

Heretofore many attempts have been made to provide casings having easy release characteristics. It is known in the art, as disclosed, for example, in U.S. Pat. Nos. 2,901,358 to Underwood et al, 3,106,471 and 3,158,492 to Firth, 3,307,956 and 3,898,348 to Chiu et al, 3,442,663 to Turbak, and 3,558,331 to Tarika, that the application of certain types of coatings to the inside wall of food casings may afford improvement in the release characteristics of the casing from the encased sausage product.

It has been common practice to improve the peelability characteristics of food casings from raw unprocessed pork-containing products to employ an acid shower to denature the meat and aid skin formation prior to chilling or freezing the meat. However, such an additional step can be time consuming and labor intensive. Thus, it would be desirable to eliminate this heretofore common step.

A limitation of the presently available raw unprocessed pork-containing products prepared in cellulosic food casings is that they have limited distortion resistance during physical handling after peeling of the casing. That is, the chilled or frozen products tend to break or deform on moderate handling.

Still another limitation of these presently available raw unprocessed pork-containing products is that they tend to lose the desirable reddened color or "bloom" after a short period following peeling of the cellulosic casing.

An object of this invention is to provide an improved cellulosic food casing article for use in the production of raw unprocessed pork-containing product.

Another object is to provide an improved method for producing unprocessed pork-containing product using cellulosic food casing.

Still another object is to provide an improved product comprising raw unprocessed pork-containing product in a cellulosic food casing, the latter being peelable with commercial machinery from the pork mass without damage thereto and without acid showering or thermal processing.

A further object is to provide a raw unprocessed pork-containing product having a denatured reddened outer skin with improved distortion resistance and longer bloom retention.

These and other objects are achieved by the present invention as described hereinafter.

SUMMARY OF THE INVENTION

One aspect of the invention relates to a shirred moisture-containing cellulosic food casing article uniformly impregnated in its wall with an aqueous mixture of an acid and a buffer for the acid wherein the mixture is completely dissolved in the casing moisture and present in quantity sufficient to maintain the casing pH in the range of between about 3.5 and about 4.8. The mixture comprises the casing sole peeling aid in the wall.

Another aspect of the invention relates to a method for producing raw unprocessed pork-containing product with a denatured reddened frozen outer skin. In the method, a cellulosic food casing is provided having pH of at least about 5. The casing wall is uniformly impregnated with an aqueous completely dissolved mixture of an acid and buffer for the acid. The impregnation is sufficient in quantity to reduce the casing pH to the range of between about 3.5 and about 4.8. The mixture comprises the casing sole peeling aid. The acid-buffer mixture impregnated casing is shirred and, when ready for use, it is deshirred and stuffed with raw pork-containing emulsion in direct contact with the casing inner surface. During this stuffing and subsequent storage (if needed), the raw pork mass outer skin is denatured by contact with the acid-buffer mixture in the casing inner wall. The raw pork-stuffed casing is cooled so as to freeze at least the outer skin of the raw pork mass. Then the casing is peeled from the frozen and denatured outer skin of the raw pork-containing mass without further acid treatment. This peeling may be achieved with presently used commercial high speed equipment without damage to the pork skin. The method eliminates the conventional acid shower step. The buffered acid impregnated casing pH should be at least about 3.5 to avoid cellulose degradation. Also, at the preferred loading levels, the pH should not exceed about 4.8 to permit shirring by avoiding surface crystallization and also to realize high speed peeling without damage to the frozen raw pork outer skin. A preferred casing pH range is between about 3.7 and about 4.0.

A further aspect of the invention is a raw unprocessed pork-containing product having a denatured outer skin, comprising a moisture-containing cellulosic casing having its wall impregnated with a mixture of an acid and a buffer for the acid. The mixture is completely dissolved in the casing moisture and present in sufficient quantity to maintain the casing pH in the range of between about 3.5 and about 4.8. The mixture comprises the casing sole peeling aid in the casing inner wall. The casing is stuffed with a raw unprocessed pork-containing food mass and the latter's outer skin is denatured from contact with the acid-buffer mixture in the casing wall. At least the food mass outer skin is frozen. The casing is peelable from the denatured pork-containing mass frozen outer skin without further acid treatment or thermal processing.

The outer skin of the pork-containing food mass is reddened and darkened by virtue of the denaturization. Preferably, this darkening is sufficient to provide a colorimetric Δ"L" value difference between the fresh pork-containing food and the frozen denatured outer skin which is at least 4. Also, the reddening is preferably sufficient to provide a colorimetric Δ"a" value difference between the fresh pork-containing food mass and it's frozen denatured outer skin which is at least 4.

The invention also includes a raw unprocessed pork-containing product having a denatured outer skin with improved distortion resistance and preferably longer bloom retention if reddened from denaturing. This product is prepared by the steps of first stuffing a raw unprocessed pork-containing food mass in a cellulosic food casing having uniformly impregnated in the casing wall an aqueous completely dissolved mixture of an acid and a buffer for the acid, in quantity sufficient to reduce the casing pH to the range of between about 3.5 and about 4.8 with the mixture comprising the casing sole peeling aid. By contact with the acid-buffer mixture in the casing inner wall, the raw pork-containing food mass outer skin is denatured and develops improved distortion resistance during the stuffing. Next, the raw pork-stuffed casing is cooled and then the casing is peeled from the cooled raw pork mass denatured outer skin without further acid treatment.

The acid employed in the instant invention preferably is selected from the food grade group consisting of malic acid, tartaric acid, adipic acid, succinic acid, citric acid, acetic acid, lactic acid, propionic acid, sorbic acid, fumaric acid, and mixtures thereof. Other suitable acids include phosphoric acids such as pyrophosphoric acid. The acid material is generally present in an amount of at least 1 percent by weight based on the weight of the casing.

The buffering agent employed in this invention is preferably selected from the edible salts of said aforementioned food-grade acid material such as the alkali metal salts of malate, tartrate, adipate, succinate, citrate, acetate, and mixtures thereof, Inorganic buffering agents, such as the phosphate salts, are also suitable.

In yet another aspect, the invention relates to a raw pork sausage-containing package including an outer moisture containing, cellulose casing having an acid-buffer mixture completely dissolved in the casing moisture and uniformly impregnated in the casing wall and in sufficient quantity to maintain the casing at a pH of between 3.5 and 4.8. The acid-buffer mixture is the sole peeling aid of the casing. Within this outer casing is a raw pork-containing food mass having its outer surface denatured and formed to a skin by reason of the contact of the food mass with the acid-buffer mixture impregnated in the casing and the casing being peelable from the denatured outer surface of the food mass without further acid treatment.

DETAILED DESCRIPTION OF THE INVENTION

Figure 1:
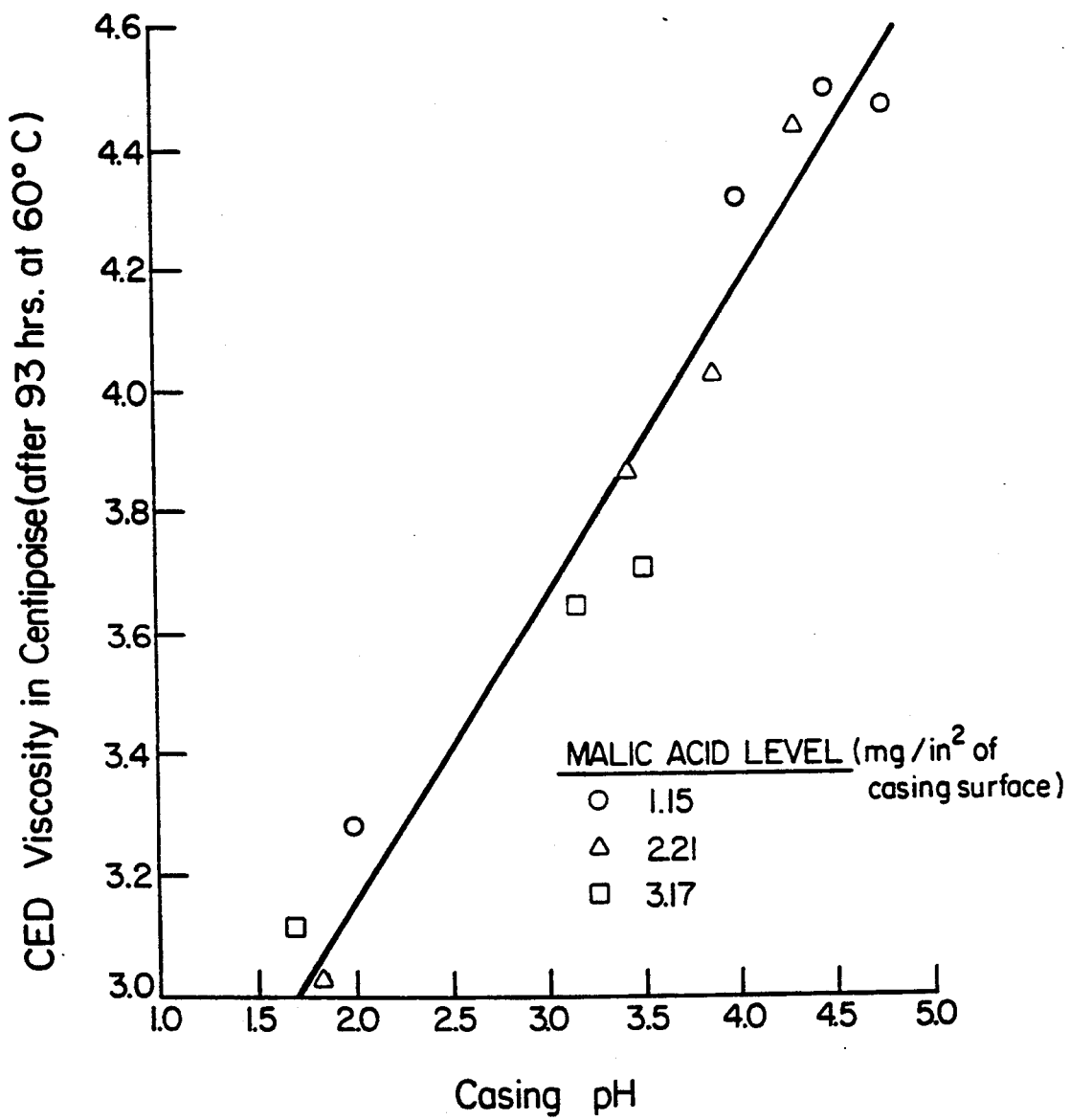
FIG. 1 is a graphic representation of casing cupriethylene-diamine disperse (CED) viscosity under accelerated aging conditions as a function of casing pH employing TAPPI test method #T230. This test is commonly used in cellulose chemistry to indicate the molecular chain length or degree of polymerization. The CED viscosity values are related to the cellulose chain structure, and therefore, serve as an indication of degradation of the cellulose casing material.

In the preferred practice of the instant invention, a cellulosic food casing is treated with a composition comprising homogeneous aqueous solutions containing at least one food-grade acid selected from the group consisting of malic acid, tartaric acid, adipic acid, succinic acid, citric acid, acetic acid, lactic acid, propionic acid, sorbic acid, fumaric acid, phosphoric acid, or mixtures thereof, by applying said acid to the surface of the food casing in an amount of from between about 1.5 mg./in.$^2$ to about 2.5 mg./in.$^2$ of casing surface, preferably in an amount of about 2.0 mg./in.$^2$ of casing surface; and at least one food-grade buffering agent selected from the alkali metal salts of the aforementioned acid materials in an amount which is sufficient to bring the pH of the casing to a value in the range of between about 3.5 and about 4.8.

The effectiveness of certain acid and buffered acid impregnations of cellulose casing in terms of denaturing the outer surface of raw unprocessed pork and beef-containing food mixture was qualitatively determined after manual peeling of the casing. In the same tests, skin formation of the peeled sausage was qualitatively evaluated in terms of resistance to deformation of manual bending until the emulsion broke through the skin. Since the most effective denaturing is achieved by the direct immersion of the fresh stuffed cellulose casing in an acid bath, this treatment was arbitrarily assigned a value of 10 for both reddened color development as visually observed, and deformation resistance. The results of these quantitative tests are summarized in Table A.

TABLE A

| Casing Type | Acid Evaluation | | Casing pH |
|---|---|---|---|
| | Color | Distortion Resistance | |
| 1-Regular | 0 | 0 | 5.32 |
| 1A-Citric Acid Dipped | 10 | 10 | — |
| 1B-Acetic Acid Dipped | 10 | 10 | — |
| 2-Citric Acid Coat | 4 | 4 | 3.00 |
| 3-Citric Acid/Na Citrate 4:1 | 2 | 4 | 3.20 |
| 4-Acetic Acid Dipped | 2 | 4 | 3.26 |
| 5-Acetic Acid/Na Acetate 2:1 | 1 | 3 | 3.97 |
| 6-Acetic Acid/Na Acetate 4:1 | 2 | 4 | 3.80 |
| 7-Malic Acid Dipped | 6 | 8 | 3.08 |
| 8-Tartaric Acid Dipped | 5 | 5 | 3.60 |
| 9-Ascorbic Acid Dipped | 0 | 1 | 3.11 |
| 10-Lactic Acid Dipped | 3 | 5 | 2.65 |
| 11-Glucono-Delta-Lactone Dipped | 0 | 1 | 3.20 |

Sample 1 had no acid treatment prior to peeling. Control Samples 1A and 1B were immersed in acid baths after stuffing and prior to peeling. In each of the remaining samples, the casings were impregnated with an acid or buffered acid as prior to stuffing as noted in Table A.

All impregnation coatings except Sample 9 were at acid loadings of 1.5 mg./in.$^2$. Sample 9 was 1.0 mg./in.$^2$ because this was the water solubility limit. For the buffered samples the salt loading was the indicated fraction of the acid loading.

Inspection of Table A shows that malic acid was the most effective of the impregnation systems both in terms of reddened color development and distortion resistance. On the other hand, ascorbic acid and glucono delta lactone were ineffective from both standpoints.

Referring now to the drawings, it can be seen from FIG. 1 that casing degradation is a function of casing pH. That is, as shown in FIG. 1, the lower the casing pH, the more the casing degrades during prolonged storage as evidenced by the lower CED viscosity values of the casing. CED viscosity was measured in centipoise units after 93 hours at 60° C., i.e. accelerated aging. It has been found that buffering the low pH casing, or combining a buffering agent with the acid material used in treating the casing to raise the casing pH, reduces casing degradation and still enables the casing to maintain its color-imparting capability. By the same token, it has been found that buffering the low pH casing to a higher pH casing, or adding a buffering agent to the acid material used in treating the casing, may cause crystallization of the acid and buffering agent to occur on the casing surface. Such crystallization on the casing surface results in casings which are not shirrable, or which are very difficult to shirr. More specifically, the crystalline deposits on the casing surface cause the shirring rolls to slip on the casing and prohibit normal pleat formation. However, such crystallization on the casing surface is prevented in accordance with this invention, as is more fully described hereinafter. The key relationship is the condition of the acid-buffer mixture on the casing outer surface when it first contacts the shirring wheels.

Figure 2:
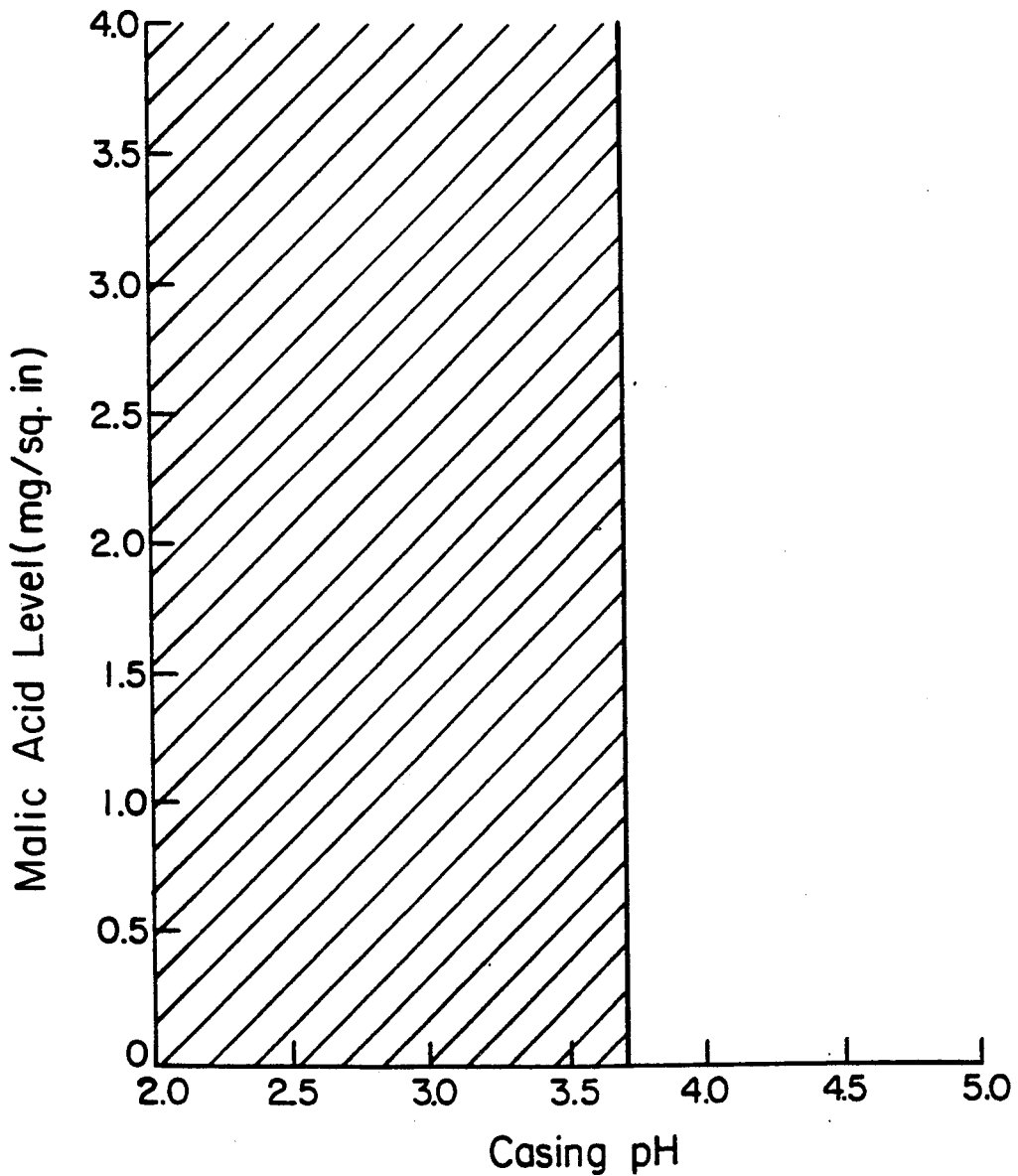
FIG. 2 is a graphic representation of the effect of malic acid loading on casing degradation wherein the shaded area represents unacceptable casing degradation.

FIG. 2 is a graph showing the effect of malic acid loading level in mg./in.$^2$ of casing surface on casing degradation. This was determined by CED viscosity tests at ambient temperature and elevated temperature for accelerated aging, using a CED viscosity of about 4 as a minimum acceptable guideline. In these tests it was determined that 17–20 hours at 60° C. was approximately equivalent to one month storage at ambient temperature. The total test period was equivalent to about 8 months storage at ambient temperature. The shaded area in FIG. 2 represents unacceptable casing degradation with the range of pH of about 3.5 to 3.7 being boarderline in terms of unacceptable casing degradation. It can be seen from the graph of FIG. 2 that regardless of the malic acid loading, the casing pH should exceed about 3.5 and preferaly should exceed 3.7 to be in a safe range to prevent degradation.

Figure 3:
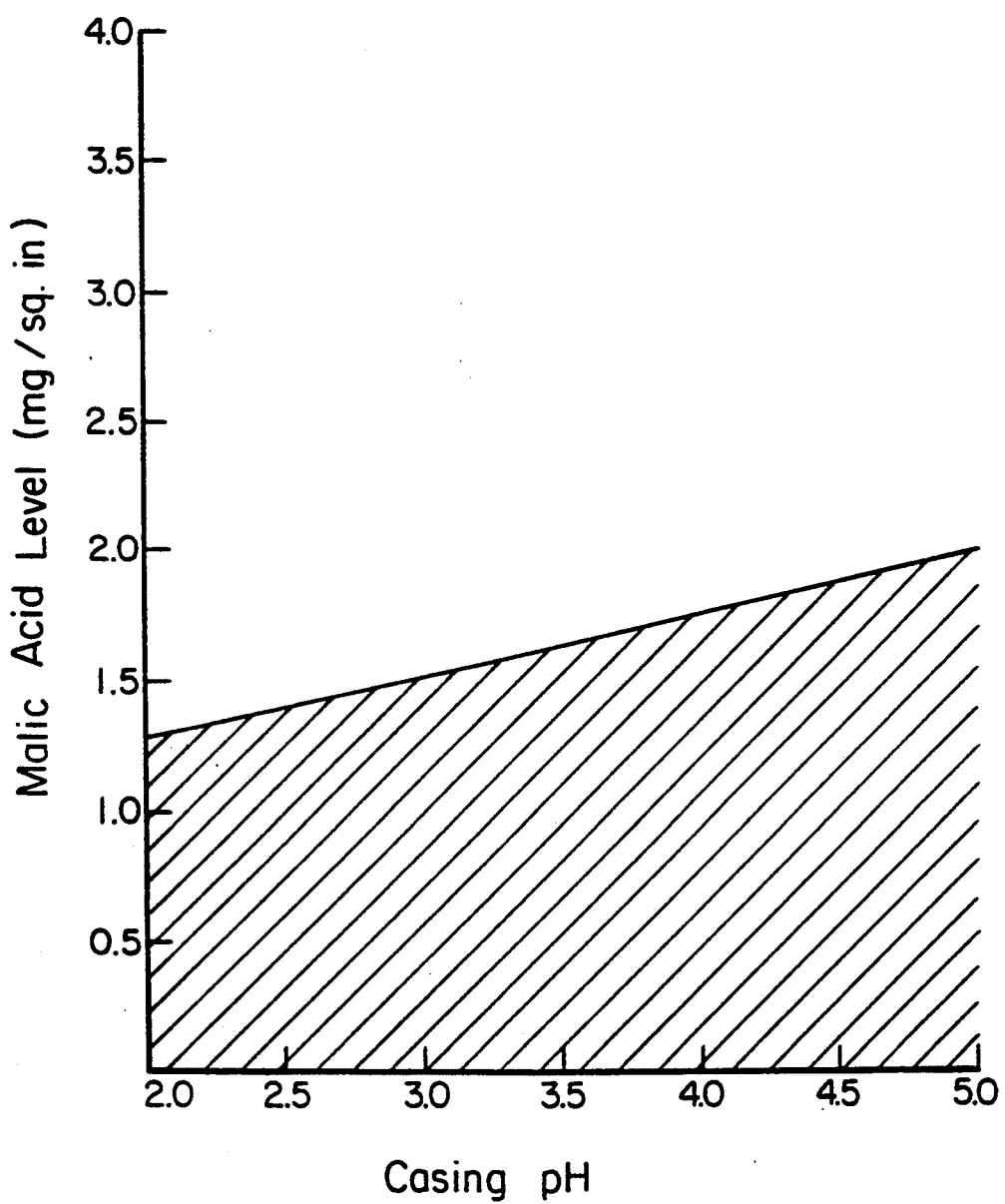
FIG. 3 is a graphic representation of the effect of malic acid loading on sausage skin formation and color, wherein the shaded area represents unacceptable skin formation and color.

FIG. 3 is a graph showing the effect of malic acid loading level in mg./in.$^2$ of casing surface on pork-containing meat skin formation and bloom. The shaded area in FIG. 3 represents unacceptable skin formation and bloom. The criteria for acceptable skin formation is a bending test of the pork-containing meat mass as described further herein below. It has been observed that as skin formation improves, bloom or color also will improve. Consequently, if skin formation is acceptable, bloom or color also is acceptable.

It can be seen from the graph of FIG. 3 that as the casing pH is increased (by using more buffering agent), the total acid loading must be increased in order to maintain acceptable skin formation and bloom. For example, casing with a 3.0 pH must contain 1.5 mg./in.$^2$ or more malic acid and casing with 5.0 pH must contain 2.0 mg./in.$^2$ or more malic acid to yield acceptable skin formation and bloom.

Figure 4:
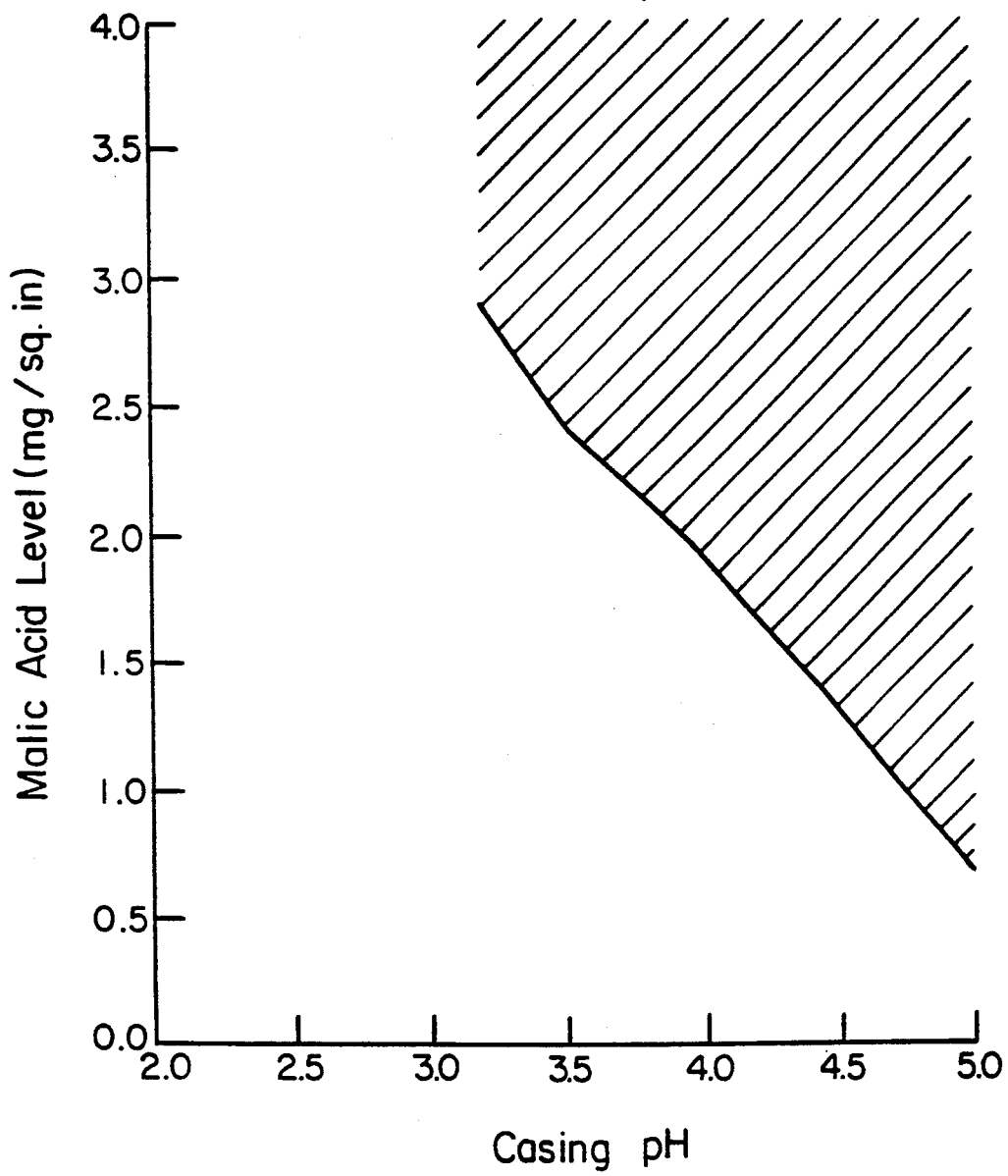
FIG. 4 is a graphic representation of malic acid-sodium malate loading wherein the shaded area represents unacceptable crystallization on casing surface.

FIG. 4 is a graph showing when crystallization will occur at various malic acid loadings when buffered with sodium malate. This graph is based on the assumption that only 3.1 mg./in.$^2$ of water is available in the casing to maintain the malic acid and sodium malate in solution and that the cosolubility of malic acid and sodium malate in water is 56 wt % of the total solution. The shaded area in FIG. 4 represents unacceptable malic acid and sodium malate loading levels resulting in crystallization on the casing surface. It can be seen, for example, that casing containing 2.0 mg./in.$^2$ malic acid can be buffered with sodium malate to a casing pH of 3.5 without precipitating on the casing surface. However, if additional sodium malate is added to bring the casing pH to 4.5, some of the malic acid and sodium malate will precipitate on the casing surface.

Figure 5:
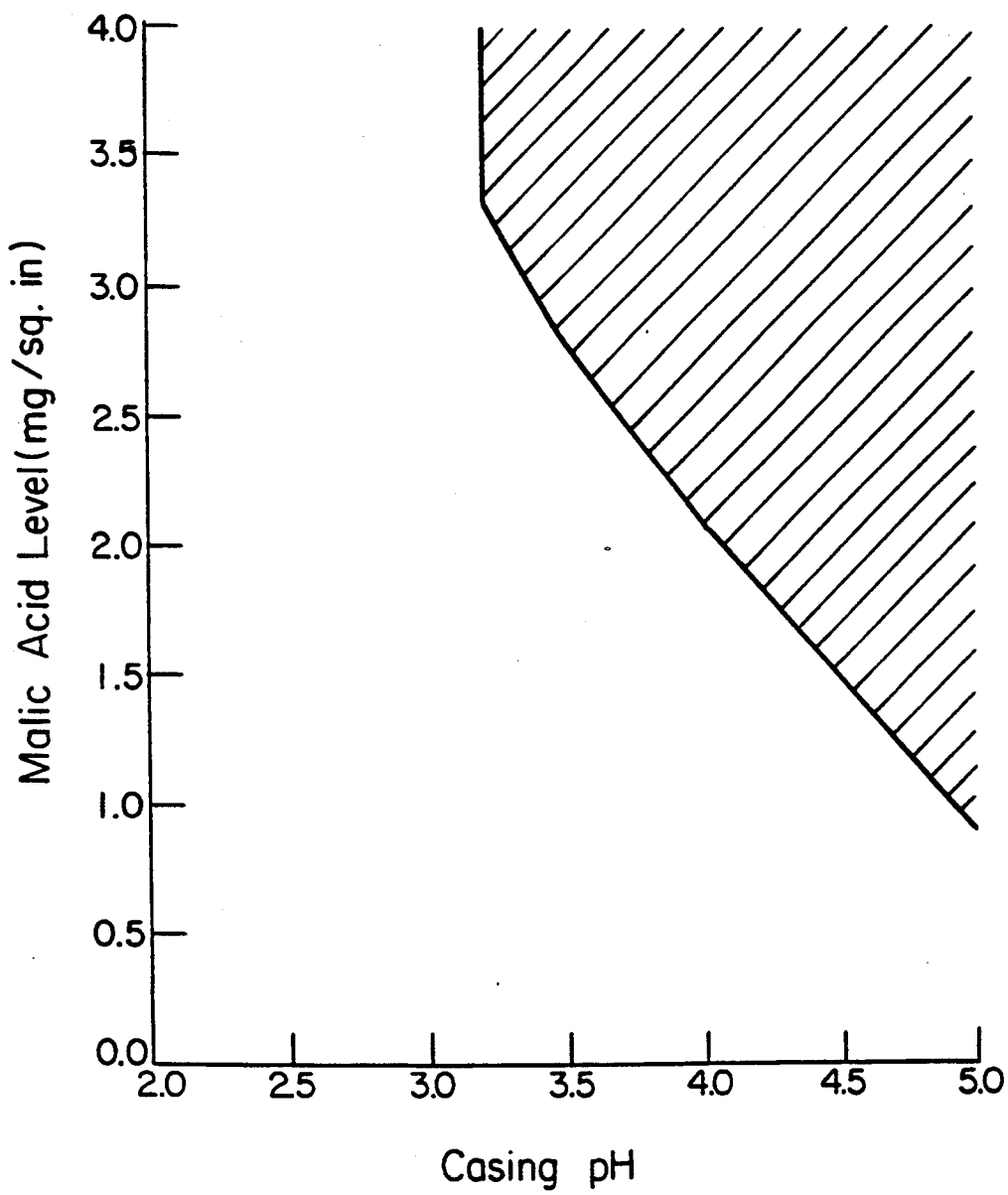
FIG. 5 is a graphic representation of malic acid-sodium citrate loading wherein the shaded area represents unacceptable crystallization on casing surface.

FIG. 5 is a graph showing when crystallization will occur at various malic acid loadings when buffered with sodium citrate. The shaded area represents unacceptable loading levels resulting in crystallization on the casing surface. Comparing FIG. 5 to FIG. 4, it can be seen that for a given malic acid loading, a slightly higher casing pH can be attained before crystallization occurs if sodium citrate is used as the buffering agent instead of sodium malate. This is because sodium citrate is a more powerful buffering agent, resulting in a lower loading required to buffer to a given pH. These constituents probably coexist in the aqueous solution as disassociated ions.

Figure 6:
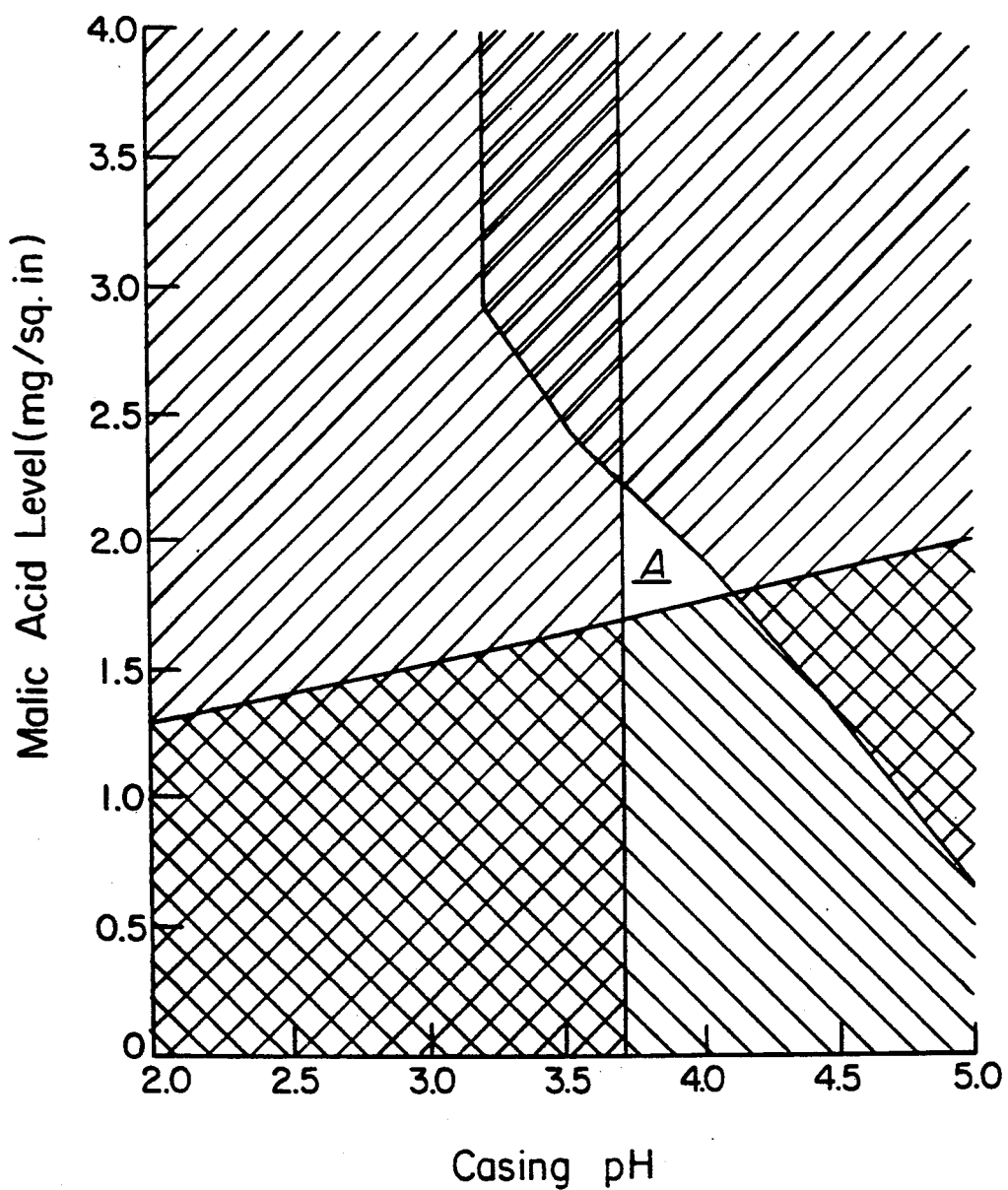
FIG. 6 is a graphic representation of the superimposed graphs of FIGS. 2, 3 and 4.

FIG. 6 is a graph showing the graphs of FIG. 2, FIG. 3 and FIG. 4 superimposed over each other, thereby resulting in unshaded preferred functional operating area A when employing various malic acid and sodium malate loading levels (in mg./in.$^2$ of casing surface) which are satisfactory with respect to acceptable casing degradation, skin formation and color on the pork-containing meat mass, and freedom from crystallization of the acid and buffering agent. Thus, unshaded area A shown in FIG. 6 represents a preferred embodiment of this invention wherein a cellulose food casing is treated with a malic acid-sodium malate aqueous impregnating solution.

Figure 7:
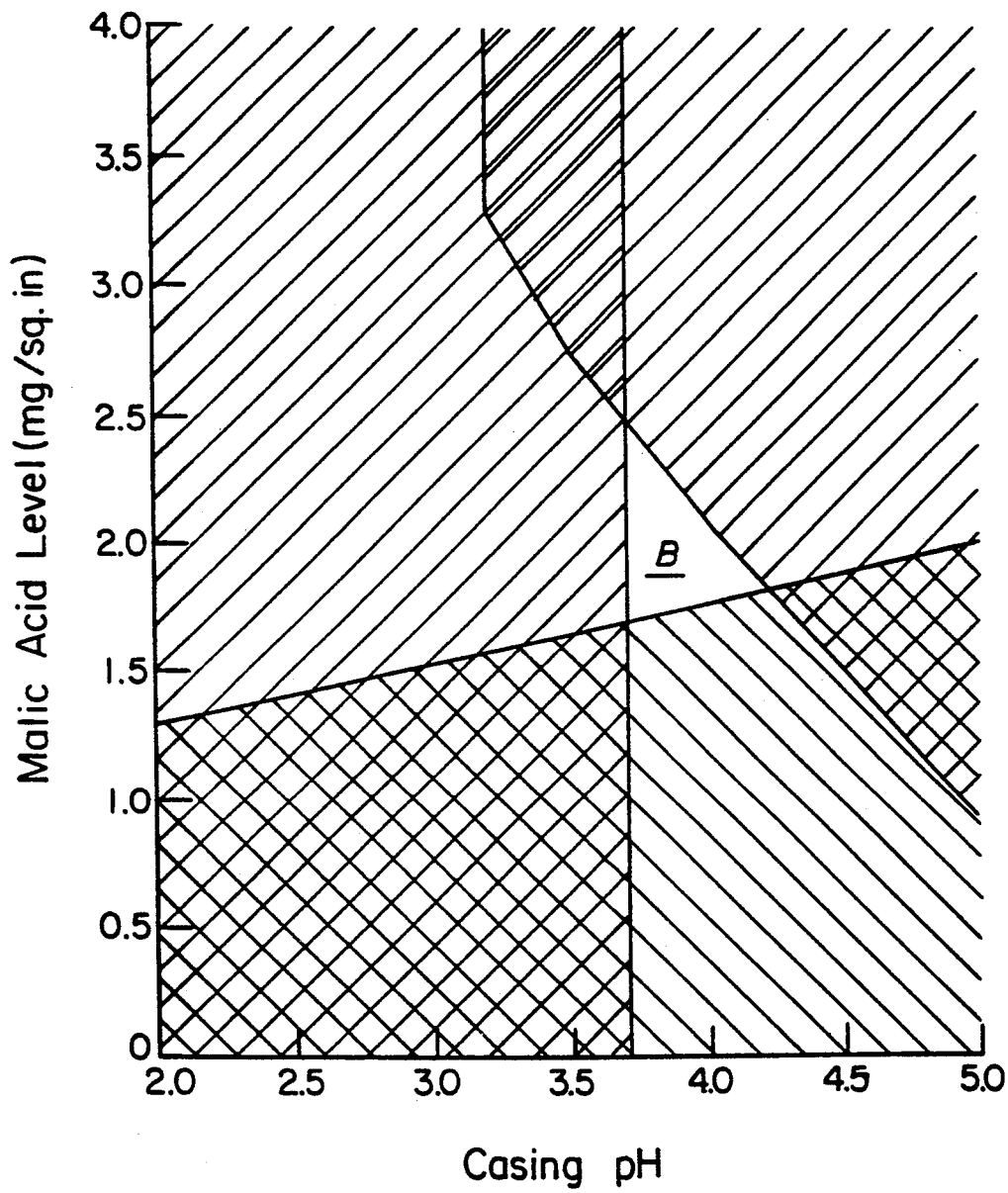
FIG. 7 is a graphic representation of the superimposed graphs of FIGS. 2, 3 and 5.

FIG. 7 is a graph showing the graphs of FIG. 2, FIG. 3 and FIG. 5 superimposed over each other, thereby resulting in unshaded preferred functional operating area B when employing various malic acid and sodium citrate loading levels (in mg./in.$^2$ of casing surface) which are satisfactory with respect to acceptable casing degradation, skin formation and color on the pork-containing meat mass, and freedom from crystallization of the acid and buffering agent. It can be seen therefrom that unshaded area B is larger than unshaded area A. This is because sodium citrate, which has about the same water solubility as sodium malate, is a more powerful buffering agent than sodium malate, thus requiring less buffering agent to achieve the desired casing pH, and thus in turn, resulting in less crystallization on the treated casing surface. Accordingly, unshaded area B shown in FIG. 7 represents a best mode of this invention wherein a cellulose food casing is treated with a malic acid-sodium citrate aqueous impregnating solution.

It should be appreciated that in either case (as illustrated in FIG. 6 or FIG. 7) the operating areas can be increased at the risk of comprising one or more desirable features. For example, the operating areas A and B can be increased by lowering the pH towards 3.5 but this will increase the likelihood of unacceptable casing degradation (See FIG. 2).

The impregnating solution of this invention may be applied to the food casing by using any of a number of well-known methods. For example, the solution may be introduced to the casing in the form of a "slug" of liquid, and advancing the casing past the liquid slug coats the inner surface thereof. Alternatively, the casing may be passed through a dip tank containing an aqueous solution of the impregnating compositions with sufficient residence time provided to permit the composition to diffuse from the external surface through to the internal surface of the casing. Another possible application technique is to spray the aqueous solution onto the inflated casing exterior surface immediately before contact with the shirring rolls. Another method is application of the composition to the internal surface of the casing through a hollow mandrel over which the casing is advancing as, for example, the mandrel of a casing shirring machine in a manner similar to that described in U.S. Pat. No. 3,451,827 to Bridgeford, and employing the method and apparatus described in U.S. Pat. No. 4,356,218 to Chiu is also suitable.

In a best mode, the buffered acid aqueous solution of this invention is applied to a food casing by continuously moving an inflated food casing, in a vertically upward direction through an inner opening of a non-rotating flexible and resilient means which applies said composition to the casing outer surface by rubbing contact. The solution then uniformly impregnates or penetrates the entire wall of the casing. This non-rotating flexible and resilient means is described in Chiu et al U.S. Pat. No. 4,356,218 as the first flexible and resilient means. The aqueous solution is introduced into the non-rotating flexible and resilient means by any suitable means. This embodiment is illustrated in FIG. 8.

Figure 8:
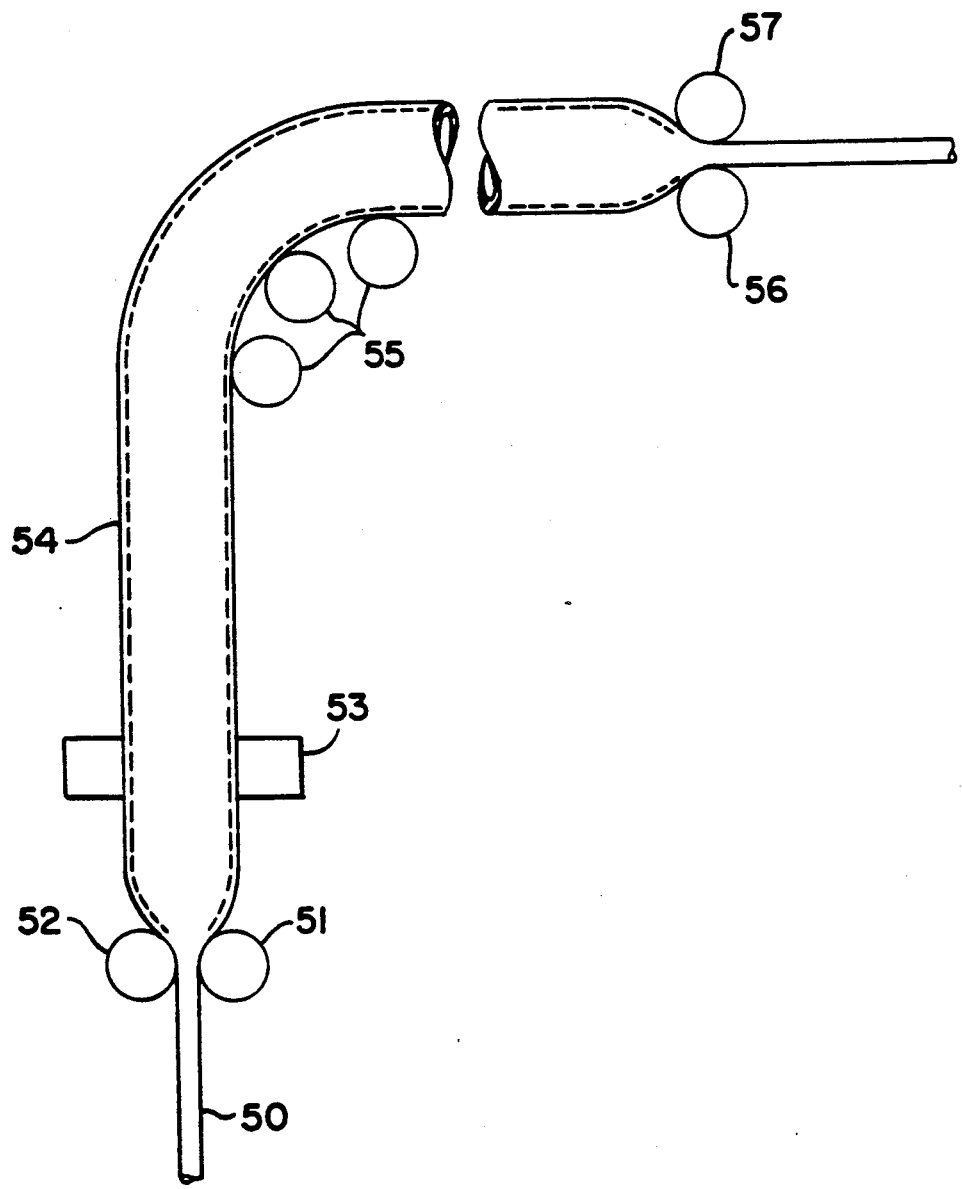
FIG. 8 is a schematic view of the best mode of treating food casings with the compositions of this invention.

In FIG. 8, a tubing of food casing 50 is guided through a pair of nip rolls 51 and 52. The tubing is inflated, and passed though the inner opening of a non-rotating flexible and resilient means 53 which applies the impregnating aqueous solution of this invention to the casing outer surface. The inflated tubing 54 is guided in a vertical direction by ladder rolls 55 and then in a horizontal direction by nip rolls 56 and 57 to further processing, such as drying of the treated tubing of food casing.

Alternatively, the acid-buffer aqueous mixture may be impregnated in the casing wall in more than one stage at different locations in the casing manufacturing system. As is understood by those skilled in the art, the casing moisture content is adjusted at several stages in this manufacturing process, and the key relationship in terms of avoiding crystallization in the condition of the acid-buffer mixture on the casing outer surface at the beginning of the shirring step. If the mixture is in the crystallized state when contacted by the shirring wheels, there will be slippage and shirring is not possible. Although it is preferred to have the acid and buffer fully solubilized in the aqueous impregnation solution, it may be possible to apply a partially solubilized mixture to the casing wall and rely on the already present casing moisture to complete solubilization of the acid and buffer.

Casing produced in accordance with the practice of the present invention can be stuffed with raw unprocessed pork-containing emulsion selected from a wide range of formulations. The so-stuffed pork food containing cellulose casing is then cooled. One option is only to chill the stuffed casing. Another is to freeze at least the raw pork mass outer skin in direct contact with the solubilized acid-buffer mixture in the casing inner wall. This may be accomplished by showering the casing outer surface with a refrigerant as for example, brine solution, preferably in the temperature range of about $-12°$ C. to about $-7°$ C.. Alternatively, the raw fresh pork-containing casing may be immersed in the brine bath for a sufficient duration to achieve this freezing of at least the outer skin. If desired, the refrigerant contact may be at low enough temperature and for sufficient duration to freeze the entire pork-containing mass. This may be preferred to minimize the possibility of damage to the mass during peeling or subsequent handling operations.

During the aforedescribed stuffing and optional storage the raw pork mass outer skin is denatured by contact with the acid-buffer mixture in the casing inner wall. Those skilled in the art understand this denaturing process to involve chemical reactions which irreversibly alter the protein's solubility. The unsolubilized proteins become a thin dense layer at the meat-casing interface. Although chilling of the stuffed pork-containing casing may be started immediately after stuffing, it may be preferable to first store same for at least a short period such as 15-90 seconds at ambient temperature. This will allow the denaturization reaction to rapidly proceed to completion.

Next the casing is removed from the food product using high-speed, automatic peeling machines without scarring or scuffing the surface thereof and with high peeling efficiency.

Preferably, the food casings of the present invention may be prepared from seamless tubular casings, particularly casings of regenerated cellulose and fibrous reinforced regenerated cellulose that are fabricated in accordance with any of the known commercial methods.

The invention will become clearer when considered together with the following examples which are set forth as being merely illustrative of the invention and which are not intended, in any manner, to be limitative thereof. Unless otherwise indicated, all parts and percentages are by weight.

Cellulosic casings conventionally known as "dry stock casings" may be used in the practice of this invention. Such casings generally have a water content within the range of from about 13 to about 18 wt %, if these are nonfibrous casings, or within the range of from about 3.5 to about 10 wt % water, if these are fibrous casings, based on the total weight of the casing, including water.

Casings conventionally known as "gel stock casings" may also be used in the practice of this invention. These casings have not been previously dried and, therefore, have higher moisture contents than the "dry stock casings".

EXAMPLE I

This example illustrates that organic acid-treated casings degrade during prolonged storage. Size 25 non-reinforced cellulose casings, commercially available from Viskase Corporation under the trade name No-jax®, having a flat width of about 1.31 inches, were used to prepare the treated casing samples of this example as shown in Table B. The gel stock casings were taken from the wet end, slugged, then dried. The dry stock casings were slugged after being dried.

TABLE B

| Casing Sample Preparation | | |
|---|---|---|
| Casing Samples | Method of Treatment | Amt. of Citric Acid (mg./in.$^2$) |
| 1 - gel stock | slugging | 1.5 |
| 2 - dry stock | slugging | 1.5 |
| 3 - gel stock | dipping | 1.5 |
| 4 - dry stock | dipping | 1.5 |
| 5 - control gel stock | — | 0 |
| 6 - control dry stock | — | 0 |

The casing samples were oven-aged at about 60° C. for various periods, and then evaluated for CED viscosity. The results of the CED viscosity evaluations are summarized below in Table C.

TABLE C

| Casing CED Viscosities (Centipoise) | | | | |
|---|---|---|---|---|
| Casing Samples | Day 1 | Day 14 | Day 20 | ΔCED |
| 1 - slugged gel stock | 4.57 | 3.78 | 3.38 | −1.19 |
| 2 - slugged dry stock | 4.61 | 3.78 | 3.52 | −1.09 |
| 3 - dipped gel stock | 4.58 | 3.95 | 3.52 | −1.06 |
| 4 - dipped dry stock | 4.57 | 3.62 | 3.40 | −1.17 |
| 5 - control gel stock | 5.15 | 4.92 | 4.84 | −0.31 |
| 6 - control dry stock | 5.38 | 4.85 | 4.93 | −0.45 |

It is seen from Table B that regardless of whether the application is made on the gel stock casing or the dry stock casing, or whether the application is made by an internal slug or by an immersion dipping, all the acid treated casings exhibited significant degradation over a twenty (20) day period as compared to the control samples which were not acid treated.

EXAMPLE II

This example shows that buffering acid-treated cellulosic food casings to a higher pH reduces casing degradation and still maintains the capability of the casing to impart good surface bloom color to the meat emulsion encased in the casing. Fifteen (15) nonreinforced cellulose casing samples were individually treated with acid solutions. The acid solution compositions, solution pH, casing pH, and acid add-on levels for treating each casing sample are shown in Table D.

TABLE D

| | Solution Compositions | | | | | | |
|---|---|---|---|---|---|---|---|
| | Malic Acid (grams) | Sodium Malate (grams) | Glycerine (grams) | $H_2O$ (grams) | Casing pH | Solution pH | Malic Acid mg./in.$^2$ |
| 1 | 10 | 0 | 45 | 945 | 2.25 | 2.33 | .63 |
| 2 | 20 | 0 | 45 | 935 | 1.99 | 2.31 | 1.31 |
| 3 | 30 | 0 | 45 | 925 | 1.92 | 2.23 | 1.58 |
| 4 | 40 | 0 | 45 | 915 | 1.83 | 2.24 | 2.21 |
| 5 | 50 | 0 | 45 | 905 | 1.96 | 2.21 | 2.04 |
| 6 | 60 | 0 | 45 | 895 | 1.68 | 2.01 | 2.99 |
| 7 | 20 | 20 | 45 | 935 | 4.01 | 3.81 | 1.15 |
| 8 | 20 | 40 | 45 | 935 | 4.48 | 4.40 | 1.15 |
| 9 | 20 | 60 | 45 | 935 | 4.78 | 4.65 | 1.15 |
| 10 | 40 | 20 | 45 | 915 | 3.44 | 3.27 | 2.22 |
| 11 | 40 | 40 | 45 | 915 | 3.89 | 3.74 | 2.22 |
| 12 | 40 | 60 | 45 | 915 | 4.32 | 4.04 | 2.14 |
| 13 | 60 | 20 | 45 | 895 | 3.15 | 3.19 | 3.35 |
| 14 | 60 | 40 | 45 | 895 | 3.51 | 3.30 | 3.28 |
| 15 | 60 | 60 | 45 | 895 | 3.86 | 3.85 | 3.07 |

Size 25 nonreinforced cellulose food casings without a special peeling-aid coating, commercially available from Viskase Corporation under the tradename Nojax®, were immersed for two hours in a container containing each of the treating solutions shown in Table D. Then each treated casing sample was passed through wipers and squeezed to remove excess treating solution. Each casing sample was then passed through a dryer and dried to a moisture content of about 6% total casing weight and then humidified to about 15.5% moisture content.

After shirring each of the treated casing samples was then deshirred and stuffed with a fresh pork-containing emulsion comprising the high collagen frankfurter formulation shown below in Table E.

TABLE E

| Frankfurter Meat Formulation | |
|---|---|
| Ingredients | Weight (lbs.) |
| regular pork trim | 46.00 |
| beef chuck | 22.00 |
| beef shank | 16.00 |
| beef cheek | 16.00 |
| water/ice | 22.00 |
| salt | 2.50 |
| spice | 1.00 |
| cure | 0.25 |

Approximately ten minutes after stuffing, the casings were removed from the meat emulsion and the uncooked samples were evaluated for skin formation, skin color uniformity, and colorimetric values. These evaluations are summarized below in Table F wherein skin formation on the meat emulsion was rated according to the following scale:

Skin Formation Scale

1. Casing cannot be removed without completely disrupting pork-containing mass outer surface—no skin.
2. Casing removed with partial disruption of meat mass outer surface and/or skin.
3. Uniform skin when casing removed; however, cannot initiate bend in meat mass without breaking outer skin.
4. Meat mass bends partially prior to breaking outer skin.
5. Meat mass bends all the way without breaking outer skin.

Skin color uniformity on the meat emulsion was rated according to the following scale:

Skin Color Uniformity Scale

1. Extremely non-uniform surface color.
2. Moderately non-uniform surface color.
3. One-half of surface non-uniform in color.
4. Slightly non-uniform surface color.
5. Uniform surface color.

TABLE F

Colorimetric, Skin Formation, and Skin Color Uniformity Evaluation on Acid-Treated Food Casings

| Samples | Casing pH | Uncooked Colorimetric Values | | Skin Formation | Skin Color Uniformity | Malic Acid mg./in.$^2$ |
|---|---|---|---|---|---|---|
| | | "L"* | "a"** | | | |
| 1 | 2.25 | 56.20 ± 1.54 | 4.86 ± 0.17 | 1 | 5 | 0.63 |
| 2 | 1.99 | 49.77 ± 0.78 | 7.50 ± 0.38 | 1 | 5 | 1.13 |
| 3 | 1.92 | 49.66 ± 1.58 | 9.88 ± 0.24 | 3 | 4 | 1.58 |
| 4 | 1.83 | 48.83 ± 0.90 | 10.22 ± 0.34 | 5 | 5 | 2.21 |
| 5 | 1.96 | 50.85 ± 2.12 | 10.04 ± 0.56 | 5 | 5 | 2.84 |
| 6 | 1.68 | 52.17 ± 1.44 | 10.07 ± 0.76 | 5 | 4 | 2.99 |
| 7 | 4.01 | 54.73 ± 0.91 | 7.49 ± 0.69 | 3 | 4 | 1.15 |

TABLE F-continued

Colorimetric, Skin Formation, and Skin Color Uniformity Evaluation on Acid-Treated Food Casings

| Samples | Casing pH | Uncooked Colorimetric Values "L" * | "a" ** | Skin Formation | Skin Color Uniformity | Malic Acid mg./in.$^2$ |
| --- | --- | --- | --- | --- | --- | --- |
| 8 | 4.48 | 52.53 ± 2.63 | 6.34 ± 0.59 | 3 | 4 | 1.15 |
| 9 | 4.78 | 53.13 ± 3.01 | 5.25 ± 0.44 | 3 | 3 | 1.15 |
| 10 | 3.44 | 47.93 ± 1.43 | 10.64 ± 0.44 | 3 | 5 | 2.22 |
| 11 | 3.89 | 50.02 ± 1.34 | 9.11 ± 1.25 | 5 | 4 | 2.22 |
| 12 | 4.32 | 50.10 ± 1.13 | 8.67 ± 2.02 | 3 | 5 | 2.14 |
| 13 | 3.15 | 52.62 ± 1.46 | 9.83 ± 0.69 | 5 | 5 | 3.35 |
| 14 | 3.51 | 52.61 ± 1.07 | 10.61 ± 0.30 | 3 | 5 | 3.28 |
| 15 | 3.86 | 51.52 ± 1.30 | 11.07 ± 0.55 | 5 | 5 | 3.07 |

* "L" values represent lightness vs. darkness. The lower the value, the darker the sample.
** "a" values represent redness. The higher the value, the redder the sample.

It is seen that all samples containing 1.5 mg./in.$^2$ or more malic acid exhibited significant red color formation as indicated by the colorimetric "a" values. It is also seen that for a given acid loading (such as Samples 7-9 and 10-11), buffering to a higher casing pH had only a slightly negative effect on the red color formation.

Referring to the colorimetric values in Table F, sample 1 may be regarded as the control because the malic acid loading is so low. On this basis the change in either the colormetric "L" or "a" value between the skin of the fresh pork-containing control sample (Sample No. 1) and the more denatured skin of any acid-buffer treated sample is obtained by determining the difference, i.e. Δ"L" or Δ"a" of their respective "L" and "a" values. For example, the Δ"L" value for sample 11 is 56.20−50.02=6.18 and the Δ"a" value for the same sample is 9.11−4.86=4.25. Skin formation values of at least 3 are considered acceptable, and the casing pH must be at least about 3.5 and preferably at least about 3.7 as previously discussed. On this basis samples 7-9, 11-12 and 14-15 are embodiments of the invention. They also demonstrate that improved colorimetric "L" and "a" values are obtained using casings of the present invention. In particular, preferred embodiments are demonstrated by Samples 11, 12, 14 and 15 wherein either, or both, the Δ"L" value and the Δ"a" value is at least 4.

In addition to controlling the casing pH by means of the acid and buffer to be applied, the practitioner of this invention needs to consider the quantity of acid required to perform the denaturization/skin formulation function for each particular system. Factors include the casing wall thickness, the type of pork-containing food mass outer skin to be denaturized, and whether blooming is desired and if so to what extent. In general, it is believed that an acid loading of about 1.5 mg/in$^2$ to about 2.5 mg/in$^2$ of casing surface is satisfactory for most systems and is preferred.

Casing samples 1-15 were stored at about 60° C. for 93 hours. The CED viscosities in centipoise values of the casings are given in Table G.

TABLE G

CED Viscosities (Centipoise) of Casings After 93 Hours at 60° C.

| Sample No. | CED Viscosity (Without Buffering Agent) | CED Viscosity (With Buffering Agent) | Casing pH |
| --- | --- | --- | --- |
| 1 | 3.51 | — | 2.25 |
| 2 | 3.28 | — | 1.99 |
| 3 | 2.96 | — | 1.92 |
| 4 | 3.03 | — | 1.83 |
| 5 | 3.14 | — | 1.96 |
| 6 | 3.11 | — | 1.68 |
| 7 | 3.28 | 4.32 | 4.01 |
| 8 | 3.28 | 4.50 | 4.48 |
| 9 | 3.28 | 4.47 | 4.78 |
| 10 | 3.03 | 3.87 | 3.44 |
| 11 | 3.03 | 4.03 | 3.89 |
| 12 | 3.03 | 4.42 | 4.32 |
| 13 | 3.11 | 3.65 | 3.15 |
| 14 | 3.11 | 3.71 | 3.51 |
| 15 | 3.11 | 3.01 | 3.86 |

It is seen that buffering the casing to a higher pH causes a significant reduction of casing degradation. The CED viscosity of buffered Sample 15 is probably in error because the value is substantially lower than the values for buffered Samples 13 and 14 having lower casing pH values. The CED value of Sample 10 also is suspect in view of its low pH. All of the remaining sample embodiments of the invention (nos. 7-9, 11-12 and 14) wherein the pH is in the range of about 3.5 to 4.8 have CED viscosity values generally in accord with the minimal acceptable value of about 4 (See discussion with respect to FIG. 2).

The following Examples III to V show that there is a solubility limit on the amount of organic acid and buffering agent that can be applied to cellulose gel stock food casings before crystallization of these materials on the casing surface occurs after the gel stock is subsequently dried to current industry moisture standards. Crystalline deposits on the casing surface render the casing unshirrable by conventional techniques, since the shirring rolls just slip or slide on the casing surface and do not pleat and compress the casing. It appears that the crystalline deposits affect the coefficient of friction between the casing surface and the shirring rolls. To avoid this problem, it is necessary to know the amounts of acid and buffering agent required (mg./in.$^2$) to obtain satisfactory colorimetric values and skin formation, the amount of water in the dried casing available to hold the acid and buffering agent in solution within the cellulose structure of the casing wall, and the aqueous co-solubility of the acid/buffering system being used.

EXAMPLE III

In this example, a nonreinforced cellulose casing having a moisture content of about 3.1 mg./in.$^2$ of casing surface (and lacking a separate peeling aid coating) was loaded with about 2.0 mg./in.² of malic acid and buffered with sodium malate to a pH of about 3.0. It was determined that a sodium malate loading of about 0.52 mg./in.² of casing surface was required to obtain a casing pH of about 3.0. The total solids content (malic acid and sodium malate) loaded on the casing was equal to about 2.52 mg./in.² of casing surface. The weight percent of solids in the casing, based on the total weight of solids and water was about 45% (2.52/5.62). Since the aqueous co-solubility of malic acid and sodium malate in the casing is about 56%, the casing of this Example did not have surface crystallization. However, based on the aforediscussed teachings of this invention, the 3.0 casing pH would result in unacceptably high cellulose degradation.

EXAMPLE IV

In this example, a nonreinforced cellulose casing having a moisture content of about 3.1 mg./in.² of casing surface (and lacking a separate peeling aid coating) was loaded with about 2.0 mg./in.² of malic acid and buffered with sodium late to a pH of about 4.0. It was determined that a sodium malate loading of about 2.22 mg./in.² of casing surface was required to raise the casing pH to about 4.0. The weight percent of the malic acid and sodium malate in the casing based on the total weight of the water and the solids (malic acid and sodium malate) was about 58% (4.22/7.32). Since the aqueous co-solubility of the malic acid and the sodium malate in cellulose casing is about 56%, some of the solids precipitated. The casing of this example displayed crystallization on the casing surface and was unshirrable.

EXAMPLE V

In this example, a nonreinforced cellulose casing having a moisture content of about 3.1 mg./in.² of casing surface (and lacking a separate peeling aid coating) was loaded with about 2.0 mg./in.² of malic acid and buffered with sodium citrate to a pH of about 4.0. It was found that a sodium citrate loading of about 1.82 mg./in.² of casing surface was required to raise the casing pH to about 4.0. The combined amount of malic acid and sodium citrate in the casing is about 55 weight percent of the total weight of the malic acid, sodium citrate and water. Since the aqueous co-solubility of malic acid and sodium citrate is also about 56 wt %, the treated casing did not incur surface crystallization. Accordingly, this represents a casing embodiment of the invention.

EXAMPLE VI

In these experiments, size 24 nonreinforced Nojax ® cellulose casings were used to package fresh pork sausage in a processing plant. Casing of one group (Group I) were the regular type, i.e. no peeling aid coating. Casings of the other group (Group II) were articles of this invention with 29.0% malic acid-22.0% sodium citrate aqueous solution impregnation at loadings of 2.0 mg./in.² malic acid and 1.5 mg./in.² sodium citrate. The method of application was by moving inflated gel stock casing (pH about 7) through a surrounding flexible and resilient means, as for example, a foam soaked with the liquid as generally described in Chiu et al U.S. Pat. No. 4,356,218. The liquid solution is transferred to the casing wall by rubbing contact with the resilient means. After drying, rehumidification and shirring, the casing articles of Group II had a casing pH of about 4.0 and about 15% moisture in a total weight basis. The casings were shirred without difficulty using conventional equipment.

The casings of both Groups were deshirred and stuffed with a fresh pork mass using conventional stuffing and linking equipment. The resulting stuffed product using the regular casing of Group I was then contacted with a vinegar solution at a concentration of about 1%–5% (wt. basis) for up to 1-2 minutes to set the skin and achieve the desired denaturing reaction with reddening of the skin. It was followed by an optional immersion in hot water at about 57° C. for up to 1–2 minutes to further set the outer skin of the fresh pork mass. The denatured product was then frozen by cooling with a brine refrigerant at about −12° C. to −13° C. for up to 30 minutes.

The resulting stuffed product using the buffered acid treated casing of Group II was processed in the same manner except that the contact with the vinegar solution was eliminated. The casings were washed to remove salt brine and peeled from the frozen fresh pork mass using conventional peeling equipment operated at about 10–20 lbs/minute. There was no damage to the outer skin of any of the frozen fresh pork bodies by virtue of this peeling.

The resistance to distortion (hereinafter referred to as "Distortion Resistance") of the skin-frozen pork-containing mass may be quantified by a post-peeling test using a scale of 0–6 with each point corresponding to 30° arc segments through which one tip of the mass can be bent towards the other without skin rupture. A Distortion Resistance value of 0 indicates poor skin formation whereas a value of 6 indicates excellent skin formation. A Distortion Resistance value of at least 4 (one of 120°) is referred in the practice of this invention.

The Distortion Resistances of the frozen pork mass processed in the two types of casing and treatments were compared by bending the two ends of each sausage until the skin ruptured. Most sausages made in regular casings of Group I could be bent to between 90° and 135° before skin rupture. On the average, the sausages made in the inventive casings of Group II could be bent to a slightly higher extent before skin rupture. This indicates a stronger skin. In one instance, with the product of this invention the sausage was bent right around 180° before the skin finally ruptured.

The bloom was compared, and from a qualitative standpoint, the frozen pork skin of this invention had a reddish color, i.e. higher "a" value from a colorimetric standpoint, than the frozen pork skin made in the regular casing and using the conventional acid spray to achieve denaturization. It also retained the bloom to a greater extent during a 60 day storage period.

EXAMPLE VII

In another test, size 30, nonreinforced Nojax ® casings were tested in a manner similar to the Group II casings of Example VI, except that after drying, rehumidication and shirring the casings of this example were found to have a pH of 3.6 and a moisture content of about 16% of total weight. The casing shirred without difficulty which indicated the absence of crystalization that would prevent shirring.

After a storage period of about one month the casings were stuffed with the following pork sausage formulation:

| INGREDIENTS | LBS |
| --- | --- |
| Lean pork | 36.0 |
| Back fat | 25.0 |
| Rind emulsion | 5.0 |
| Ice | 20.5 |
| Rusk | 10.0 |
| Sodium Caseinate | 1.5 |
| Seasoning | 2.0 |

Stuffing of the casing, using commercial stuffing equipment (Handtman FA 70 Piston Filler and Handtman VF 20 Vacuum Filler) was successful indicating the absence of unacceptable casing degradation over the storage period.

After stuffing, the encased pork-containing mass was stored at about 0° C. for twenty-four hours to chill (but not freeze) the encased product. Thereafter, the casings were successfully peeled both by hand and by mechanical means indicating that there was sufficient skin formation (denaturing by the malic acid-sodium citrate aqueous solution impregnation of the casing) to permit such peeling even without freezing.

EXAMPLE VIII

Another series of tests were conducted using size 21 nonreinforced Nojax® cellulose casings of various types to make fresh pork sausage. These products were brine chilled to about −3.3° C. to freeze the pork mass outer skin, and then peeled at a commercial rate and compared from the standpoint of skin formation. The casings were as follows:

| Casing No. | Type |
| --- | --- |
| 1 | Control with separate peeling aid coating |
| 2 | Control without peeling aid coating |
| 3 | Liquid smoke treated with sodium phosphate buffer to 5.0 casing pH |
| 4 | Acetic acid/sodium phosphate aqueous mixture treated to 5.0 casing pH |
| 5 | Malic acid/sodium citrate aqueous mixture treated to 3.8 casing pH |
| 6 | Papain* treated without separate peeling aid coating |
| 7 | Glucono-delta-lactone** treated. |

*Papain is an enzyme added to promote denaturization.
**GDL was added to improve skin formation.
***Only sample 1 had a separate peeling aid coating All casings peel without skin damage. Inspection of the skins which had formed on the outer surface of the frozen raw pork masses revealed that the product from casing 5 (an embodiment of this invention) was slightly better than the others. In particular, subjective evaluation of the skin which had formed, revealed it was less susceptible to deformation upon handling and could be bent further without skin disruption.

What is claimed is:

1. A raw unprocessed pork-containing product having a denatured outer skin comprising a moisture-containing cellulosic casing uniformly impregnated in its wall with a mixture of an acid and buffer for said acid, which mixture is completely dissolved in the casing moisture and present in sufficient quantity to maintain the casing pH in the range of between about 3.5 and about 4.8 with said mixture comprising the casing sole peeling aid in said wall, said casing being stuffed with raw unprocessed pork-containing mass with the outer skin of said mass thereafter being denatured by contact with the acid-buffer mixture in the casing wall and at least said outer skin of said mass being frozen, said casing being peelable from the denatured pork-containing mass frozen outer skin without further acid treatment or thermal processing.

2. A product in accordance with claim 1 wherein said acid is selected from the group consisting of malic acid, tartaric acid, adipic acid, succinic acid, citric acid, acetic acid, lactic acid, propionic acid, sorbic acid, fumaric acid, phosphoric acid, and mixtures thereof.

3. A process in accordance with claim 1 wherein the casing pH is in the range of 3.7 to 4.0.

4. A product in accordance with claim 1 wherein the CED Viscosity of regenerated cellulose in said casing is at least about 4.

5. A product in accordance with claim 1 wherein the buffering agent is selected from the edible salts of malic acid, tartaric acid, adipic acid, succinic acid, citric acid, acetic acid, lactic acid, propionic acid, sorbic acid, fumaric acid, phosphoric acid, and mixtures thereof.

6. A product in accordance with claim 1 wherein said acid is present in an amount sufficient to provide said casing with said acid in an amount from between about 1.5 mg./in.$^2$ to about 2.5 mg./in.$^2$ of casing surface.

7. A product in accordance with claim 1 wherein said pork-containing mass also includes beef.

8. A product in accordance with claim 1 wherein said pork-containing mass is substantially all pork.

9. A raw unprocessed pork-containing product having a denatured outer skin with improved distortion resistance prepared by the steps of:
  a) stuffing raw unprocessed pork-containing mass in a cellulosic food casing having impregnated in the casing wall an aqueous completely dissolved mixture of an acid and a buffer for said acid in quantity sufficient to reduce the casing pH to the range of between about 3.5 and about 4.8, with said mixture comprising the casing sole peeling acid;
  b) denaturing the raw pork mass outer skin by contact with the acid-buffer mixture in the casing wall;
  c) cooling the raw pork-stuffed casing; and
  d) peeling the casing from the cooled raw pork mass denatured outer skin without further said treatment.

10. A product in accordance with claim 9 wherein said pork-containing mass also contains beef.

11. A product in accordance with claim 9 wherein said pork-containing mass is substantially all pork.

12. A product in accordance with claim 9 wherein at least the outer skin of said raw pork-containing mass is reddened by said denaturing.

13. A product in accordance with claim 9 wherein the colorimetric Δ"L" value between the fresh pork-containing mass and the cooled denatured outer skin is at least 4.

14. A product in accordance with claim 9 wherein the colorimetric Δ"a" value between the fresh pork-containing mass and the cooled denatured outer skin is at least 4.

15. A product in accordance with claim 9 wherein cooling is sufficient to freeze at least said outer skin of the raw pork-containing mass.

16. A product in accordance with claim 9 wherein the frozen raw pork-containing mass denatured outer skin has a Distortion Resistance value of at least about 4.

* * * * *